(12) United States Patent
dos Reis Medeiros et al.

(10) Patent No.: US 8,400,273 B2
(45) Date of Patent: Mar. 19, 2013

(54) DEVICE FOR READING RADIO FREQUENCY IDENTIFIERS FOR VOLUMETRIC CONFINING OF THE DETECTION REGION

(75) Inventors: Carla Sofia dos Reis Medeiros, Açores (PT); Jorge Manuel Lopes Leal Rodrigues da Costa, Lisbon (PT); Carlos António Cardoso Fernandes, Lisbon (PT)

(73) Assignees: Instituto Superior Technico, Lisbon (PT); Instituto Superior de Ciencias do Trabalho e da Empresa, Lisbon (PT); Creativesystems, Sistemas e Servicos de Consultoria LDA., S. Joao Madeira (PT)

( * ) Notice: Subject to any disclaimer, the term of this patent is extended or adjusted under 35 U.S.C. 154(b) by 716 days.

(21) Appl. No.: 12/668,202

(22) PCT Filed: Jun. 26, 2009

(86) PCT No.: PCT/PT2009/000035
§ 371 (c)(1),
(2), (4) Date: Jan. 7, 2010

(87) PCT Pub. No.: WO2009/157791
PCT Pub. Date: Dec. 30, 2009

(65) Prior Publication Data
US 2010/0194538 A1 Aug. 5, 2010

(30) Foreign Application Priority Data
Jun. 28, 2008 (PT) .......................................... 104121

(51) Int. Cl.
*H04Q 5/22* (2006.01)

(52) U.S. Cl. ................. 340/10.1; 340/572.1; 340/572.7; 340/13.26

(58) Field of Classification Search ................. 340/10.1, 340/13.26, 572.7, 572.1; 705/22
See application file for complete search history.

(56) References Cited

U.S. PATENT DOCUMENTS

| | | | | |
|---|---|---|---|---|
| 5,880,695 | A * | 3/1999 | Brown et al. | 343/700 MS |
| 6,204,764 | B1 * | 3/2001 | Maloney | 340/568.1 |
| 6,392,544 | B1 * | 5/2002 | Collins et al. | 340/572.7 |
| 7,273,173 | B2 * | 9/2007 | Forster | 235/385 |
| 7,307,527 | B2 * | 12/2007 | Forster | 340/572.1 |
| 8,289,163 | B2 * | 10/2012 | Erickson et al. | 340/572.1 |
| 2004/0195319 | A1 | 10/2004 | Forster | |
| 2006/0000907 | A1 * | 1/2006 | Forster | 235/436 |
| 2007/0236174 | A1 * | 10/2007 | Kaye | 320/112 |

* cited by examiner

*Primary Examiner* — Jennifer Mehmood
*Assistant Examiner* — Rufus Point
(74) *Attorney, Agent, or Firm* — Bacon & Thomas, PLLC (57) ABSTRACT

Device for reading radio frequency identifiers (RFID) ensuring volumetric confinement at UHF of the detection of RFID tags to a desired volume above a reading surface, which includes one or more metallic transmission lines (6) printed on a dielectric substrate (8), on a metallic reference ground plane (7), an RFID reader or interrogator (3) at one end and a load (10) at the other end whereby a structure (19,21,22,23), that comprises the reading surface, in which the one or more transmission lines (6), the dielectric substrate (8) and the metallic reference ground plane (7) are embedded or attached, and the electric fields (11) are contained in planes perpendicular to the one or more transmission lines (6) with one to five wavelengths that extend over all or part of the length of the reading surface, and wherein the dielectric substrate (8) has a low permittivity, less than 1.5 and the width of the transmission line (6) is comprised between 8 and 15% of the wavelength.

10 Claims, 6 Drawing Sheets fig.1 fig.2 fig.3 fig.4a fig.4b fig.5 fig.6 fig.7a fig.7b fig.8

0 - Detected    X - Undetected fig.9

DEVICE FOR READING RADIO FREQUENCY IDENTIFIERS FOR VOLUMETRIC CONFINING OF THE DETECTION REGION

FIELD OF INVENTION

The present invention relates to radio frequency identification (RFID) systems. More particularly, the invention relates to devices for reading radio frequency identifiers while ensuring a volumetric confinement of the detection region to a desired volume above the reading surface of the device.

STATE OF THE ART

Radiofrequency identification (RFID) technology allows wireless reading and detection of RFID tags, without requiring line of sight. Each RFID tag is associated with a unique code, so that its placement on an object allows a distinctive remote identification.

A conventional RFID system includes RFID tags and one or more reader antennas connected to a radiofrequency reader or interrogator. RFID tags, which consist on a chip and an antenna, can belong to different classes depending on its operation mode: passive tags, active and semi-passive. Active RFID tags include their own power source (typically batteries) and transmit the signal to the reader continuously. Passive RFID tags are the most common, they include no battery, since the energy they require to operate is removed from the signal emitted by the reader antenna; when interrogated, the chip in the RFID tag sends back the unequivocal recorded information to the reader; their cost is lower than the other tags, but their range is lower. Semi-passive RFID tags use a battery only to power the chip. For all cases, the information transmitted by the RFID tags is likely to be automatically processed by a computer.

RFID technology operates at frequencies defined by standards and regulatory bodies, typically in the LF, HF, UHF and Microwave bands. Currently, passive UHF RFID tags are the most commonly used, given its characteristics, its low technology cost and its wider extension range when compared with other RFID bands.

In particular, the UHF RFID allocated band by the International Telecommunications Union (ITU) covers the range between 860 and 960 MHz and was divided in three sub-bands for different regions of the world.

Presently, RFID reader solutions for RF identification in the UHF band are mostly based on antennas, which alone, do not ensure volumetric confinement of the detection region.

RFID tags have a field strength threshold required for its activation and further response to the reader. In the UHF and microwave bands, localized antennas are used to produce relatively extensive coverage areas, but it is difficult to ensure sectored readings of tagged objects such as those needed for example to detect objects contained in a small detection volume, while avoiding detection of objects located in areas adjacent to the desired detection volume.

One way to confine the field to a given detection volume, with reduced dimensions in terms of wavelength, consists in associating the reader to a short range radiating device, which emits a small amount of power throughout its structure. In turn, this radiating structure will be extended along the desired coverage area. For example, a system consisting of two coplanar transmission lines ensures detection of RFID tags in the region corresponding to the interval between the two lines, U.S. Pat. No. 7,059,518, entitled "RFID Device Detection System and Method." However, this type of solutions usually requires additional adapting circuitry and does not ensures detection of the tags above its whole surface. Especially for the higher RFID frequency bands, readjusting of the co-planar lines parameters may not be sufficient to ensure the lateral volumetric confinement of the radiated field; to avoid the detection of labels outside the desired detection volume, additional metal plans barriers may be required. Solutions based on coplanar lines are typically used in RFID tags printers in the HF band to program the embedded chip, U.S. Pat. No. 6,899,476, entitled "RFID tag, antenna, and printer system."

In U.S. Pat. No. 6,600,420, entitled "Application for a Radio Frequency Identification System," is disclosed an antenna based on tape sections associated with several antenna elements for book detection and identification on bookshelves in the HF band, being adjustable for higher operating RFID bands. However, this patent does not specify any type or configuration for the antennas arranged along the tape, or looks for the individual volumetric confinement of the electromagnetic field in each shelf to prevent the reading of books on the adjacent shelves.

In the patent application WO 2006/050412, Shafer, Gary Mark and others, an antenna configured for reading and writing of a single RFID tag at each time in the UHF band is disclosed. The microstrip line used is printed on a high permittivity substrate and has an effective length equal to half or one wavelength, which is comparable to the typical size for UHF RFID tags. Thus, the disclosed antenna confines the detection, in its immediate vicinity, to an area with dimensions more or less equal to the RFID tag itself. For individual tag reading, the disclosed configuration uses longitudinal fields, restricting the readings to the tags oriented along the direction of the antenna axis. To prevent reading of adjacent tags, the volumetric confinement of the detection area is achieved by using a high permittivity value and, in some embodiments, by bending the edges of the ground plane.

The antennas mentioned above, or structures derived by frequency or size scaling, do not allow UHF RFID tag reading for tags transversal to the line which extends to entire length of the reading surface. Nor cumulatively ensure a confined detection of multiple tags within a desired detection volume above the reading surface.

SUMMARY OF THE INVENTION

The present invention relates to a device for reading the radio frequency identifiers (RFID) at UHF band while ensuring volumetric confinement of RFID tags detection to a desired volume above a reading surface.

The device comprises a structure in which are embedded or attached one or more metallic transmission lines printed on top of a dielectric substrate with an metallic reference ground plane below and also comprises an RFID reader or interrogator in one end and a matched load at the other end of the structure. The surface of the structure can correspond to the reading surface and the electric fields are contained in a plane perpendicular to the one or more transmission lines. The reading lines extend along the entire or partial length of the reading surface, with one to five wavelengths. In some embodiments the dimension of the reference ground plane is at least 90% of the reading surface. The dielectric substrate used has characteristically low permittivity. The term "low permittivity" should be understood within the technique usual meaning, which is a value lower than 2, see for example Balanis, Constantine A.—Modern Antenna Handbook; Wiley-Interscience; 2008. In the scope of the present invention it is lower than 1.5. The width of the transmission line (6) is between 8 and 15% of the wave length.

Additionally, the device may also include an adapting circuitry when the characteristic impedance of the transmission line is different from the RFID reader or interrogator.

The transmission line(s) can be straight or curvilinear along the structure reading surface. The reference ground plane may correspond to the own structure surface when it is metallic.

The range extension above the reading surface of the structure is controlled by the width of the transmission line, with values between 8 and 15% of the wavelength, and by the dimensions of the reference ground plane, extending to at least 90% of the reading surface.

The present invention also relates to an RFID tag confined reading system characterized for including a plurality of devices. A single RFID reader or interrogator can actuate at each time different device, using an electronic switch (multiplexer) for this purpose.

The present device for application in automatic RE identification systems, when associated to a reader or interrogator, allows unequivocal detection of objects labelled with passive UHF RFID tags. The invention operates at the three world assigned UHF band allocated for RFID for the different world regions without the need for adjustment or retuning.

The dimensioning previously mentioned, concerning the width of the transmission line, its length and the dimension of the reference ground plane, ensures coverage within a desired detection volume delimited above the reading. Thus avoiding fortuitous detection of RFID tags in the adjacent volumes without the need for metal or absorbing plane barriers to force isolation.

The present invention is based on a transmission line with a reference metal plane (microstrip line), which leaks from the edges a small fraction of the energy carried from the feeding point to the terminal load. The manufacturing process is very simple and its inherent costs are very low. The invention can be easily embedded or attached to existing structures, for example shelves, tables or conveyor belts.

BRIEF DESCRIPTION OF THE FIGURES

The present invention is described below in detail, as best mode of realization, using simplified schemes presented shown in the attached figures, in which.

The FIG. 6 is a schematic representation of an realization in which the invention is embedded in a conveyor belt, for object detection in accordance with the invention.

In these figures, the identification of each particular element in question is made using a unique number. When an element is repeated in different pictures, the same identification is used that in the first figure in which the element appears.

DETAILED DESCRIPTION OF THE INVENTION AND BEST MODE OF REALIZATION

With reference to the figures, below are described in detail the best modes of realization of the invention.

Figure 1:
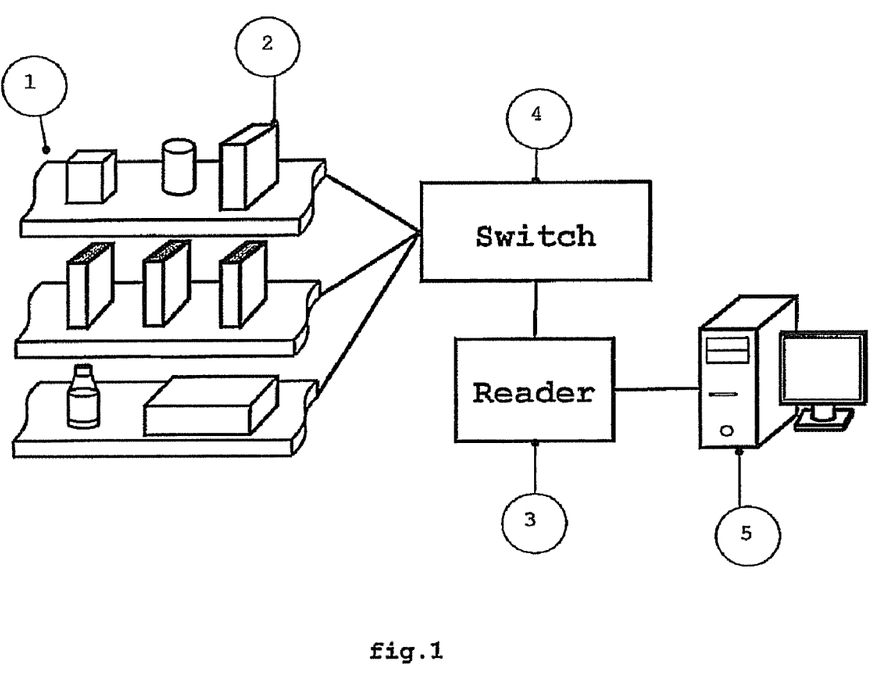
FIG. 1 is a representation of an intelligent RFID system for object detection within confined detection volumes using the object device of this invention.

FIG. 1 shows a radio frequency identification system of the present invention. In each structure 1 in the system, the invention device 1 is embedded or attached, operating in the UHF RFID band for the detection and identification of objects 2 containing RFID tags 13 (not represented). Each device in the system is connected to an RFID reader or interrogator 3, directly or through an electronic switch 4 (multiplexer), that enables communication and data transmission to a computer application 5 for processing or recording the reading results.

In a system with multiple devices 1 and where the devices 1 are close to each other, as shown in FIG. 1, it is required to prevent the reading of objects placed in adjacent surfaces to the one being interrogated. The present invention ensures radiofrequency isolation between structures, confining the electromagnetic radiated field to the volume of each device, avoiding the need for metallic shields barriers or other expensive physical means of isolation. For this, the parameters of device are dimensioned to ensure a delimited detection volume.

Figure 2:
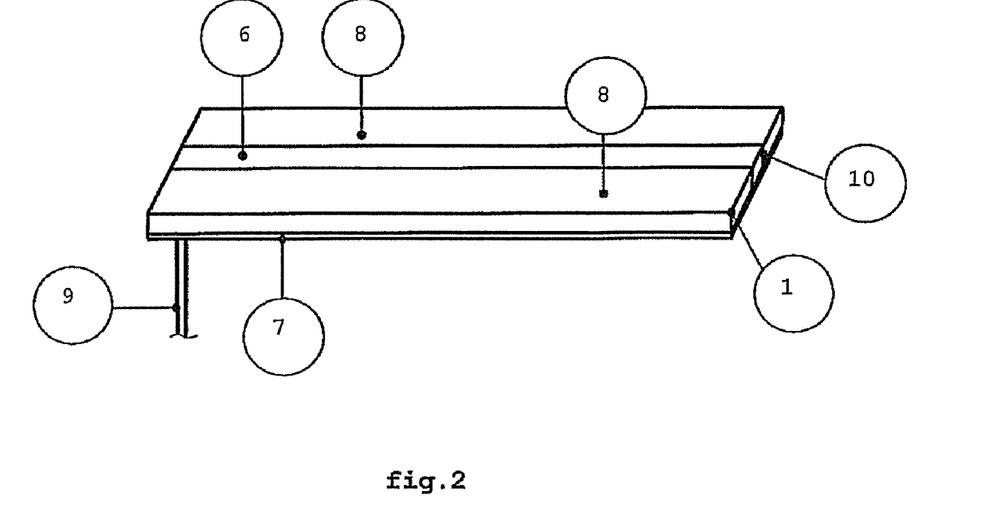
FIG. 2 is a schematic representation shown in perspective of an embodiment of the device, in its simplified form, according to the invention, without the piece of wood or plastic that hides and protects the transmission line.

FIG. 2 shows the simplest embodiment of the invention for the device 1. It corresponds to a metallic transmission line 6 (for example: brass or aluminium) with a reference ground plane 7, also metallic, and supported by a low permittivity substrate 8 (for example expanded polystyrene) (microstrip structure).

The structure is fed by the RFID reader or interrogator 3 or by an independent source on one end, e.g. via a coaxial cable 9, and terminated at the other end by a load 10 adapted to the characteristic impedance of the transmission line 6. On UHF, the termination is simply a resistance.

The width of the transmission line 6 can be varied in the project, with values between 8 and 15% of the wavelength, to adjust the field volumetric confinement and detection of the RFID tags 13, depending on the width and height of the intended coverage area above it. The resulting transmission line 6 characteristic impedance value is known and can be calculated as in Ramo, Whinnery and Duzer—Fields and Waves in Communication Electronics, 3$^a$ edição; Wiley-Interscience; pag. 412; 1994.

In the case where the characteristic impedance of the transmission line 6 is different from the RFID reader or interrogator 3 impedance, it is required to add a matching circuit between the device 1 and the RFID reader or interrogator 3 or the electronic switch 4 (if present) in FIG. 1.

Together with this versatility of the invention adds the fact that the operation of the transmission line 6 is independent of the device 1 length between one and five wavelengths.

Additionally, the same transmission line 6 operates across the entire UHF band for RFID and thus is immediately compatible with readers of the three world sub-bands allocated for REID. This is because the parameters of transmission line 6 are dimensioned according to the thickness and permittivity of the low permittivity substrate 8 and its operation does not depend of the size of the surface in which it is applied. Taking into account the limitations in the transmission line 6 width and to ensure equal characteristic impedance to the RFID reader or interrogator 4, the low permittivity substrate 8 height must be, for example, between 2 and 5% of the wavelength for a 50Ω characteristic impedance and between 4 and 10% for a 75Ω characteristic impedance. Using the characteristic impedance equation described in Ramo, Whinnery and Duzer—Fields and Waves in Communication Electronics, $3^a$ edição; Wiley-Interscience; pag. 412; 1994, the low permittivity substrate 8 height can be modified so that different values for the characteristic impedance are obtained.

Figure 3:
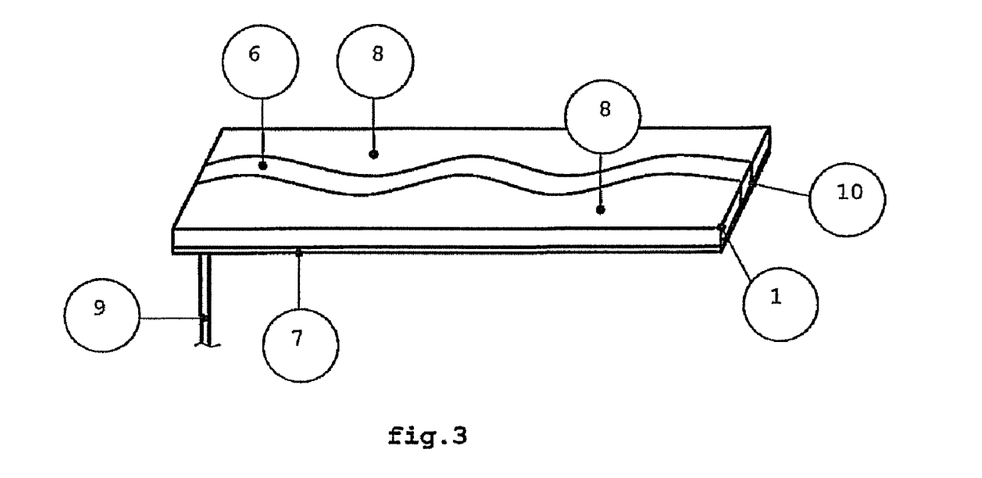
FIG. 3 is a representation of an embodiment of the device according to the invention in a curvilinear configuration, without the piece of wood or plastic that hides and protects the transmission line.

The configuration and arrangement of the transmission line 6 can be changed depending on the desired extension for the detection volume including more than one transmission line 6 in the circuit or changing the path of, for example according to the configuration of the transmission line 6 with a curvilinear path as shown in FIG. 3, as long as the transmission line 6 total path is longer than one wavelength and shorter than five wavelengths and the reference ground plane 7 extends for at least 90% of the reading surface.

Figure 4A:
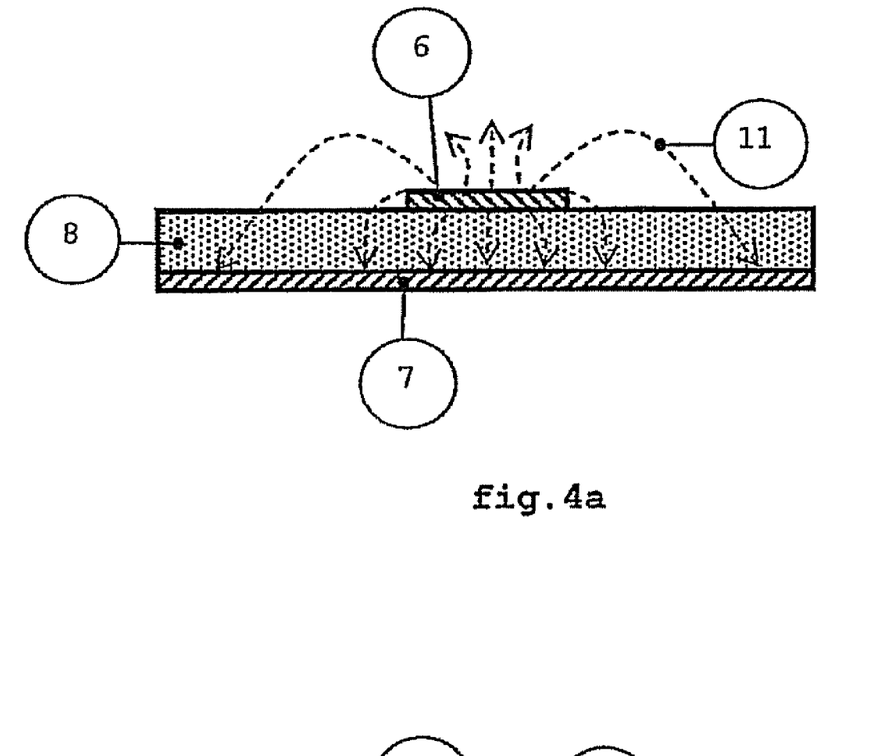
FIG. 4a and FIG. 4b are schematic cross-section representations of the device in FIG. 2 and FIG. 3: a) without the coating material, b) with the coating material.
Figure 4B:
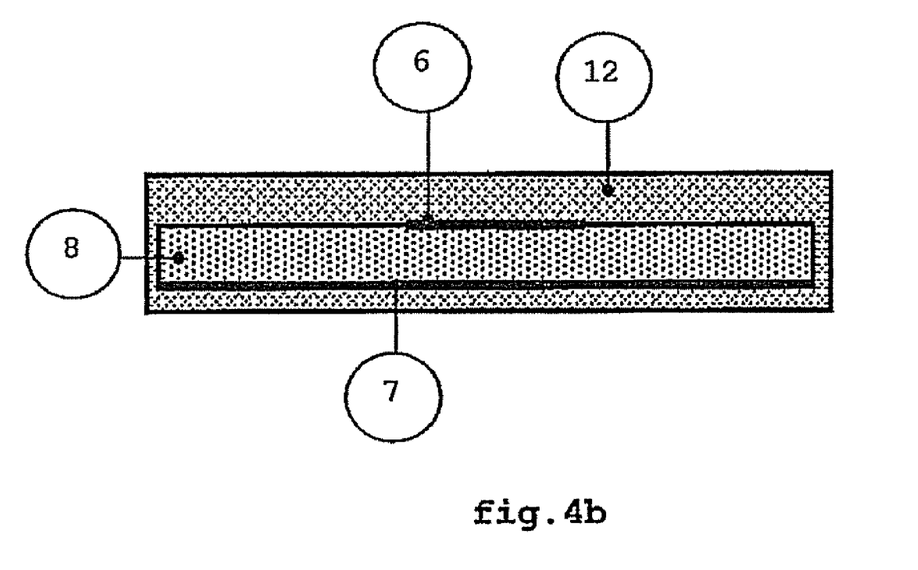

FIG. 4a shows a cross section of the device 1 structure shown in FIG. 2 and in FIG. 3, for example at the centre of the circuit, in which can be seen in detail the transmission line 6, the reference ground plane 7 and the low permittivity substrate. The thickness of these metallic elements is not crucial to the dimensioning of the transmission line 6, these may have a thickness so reduced as the fabrication allows. In FIG. 4b are also represented the lines of electric field 11 for this type of transmission lines, which flow mainly from the transmission line 6 to the reference ground plane 7, through the low permittivity substrate 8, and the remaining being radiated laterally and vertically away from the structure.

The intensity and spatial distribution of the radiated energy can be controlled by adjusting the permittivity value and height of the low permittivity substrate 8, the width of the transmission line 6 and its shape along the path. When the shape of transmission line 6 is curvilinear, for example in sinusoidal shape, as shown in FIG. 3, the field distribution over a period of the curve becomes asymmetric in depth. In this case, the detection range in a plane perpendicular to the surface of the device 1 increases in a controlled manner, while also improving reliable detection for all possible RFID tags 13 orientations. Dimensioning, adjusting the width of the transmission line 6, between 8 and 15% of the wavelength, allows limiting the lateral extension of the RFID tags 13 detection region avoiding detection of the RFID tags 13 on the surrounding structures. In addition, the limits of the detection zone can be further adjusted by controlling the RF power provided by the REID reader or interrogator 3, feature available on some REID reader models.

The invention also allows additional layers of substrate 12 to be placed over the transmission line 6 or around the complete structure without affecting its performance, as shown in FIG. 4b. These additional layers of substrate 12 can be used for example to enhance the structure stability and to protect the transmission line 6. If the thickness of additional layers of substrate 12 is less than about ⅕ of the wavelength, the electric field intensity is sufficient to ensure detection in the entire device 1 surface. Therefore, the transmission line 6 circuit can be embedded on wood or plastic structures or attached as a pre-fabricated module. In the case of metallic surfaces, the invention is also applicable without the need to resize the structure. Also the reference ground plane 7 may be replaced by the structure itself if it is metallic. All embodiments of the disclosed invention are of simple realization and can be easily hidden inside the structures.

Example 1

Shelves

Figure 5:
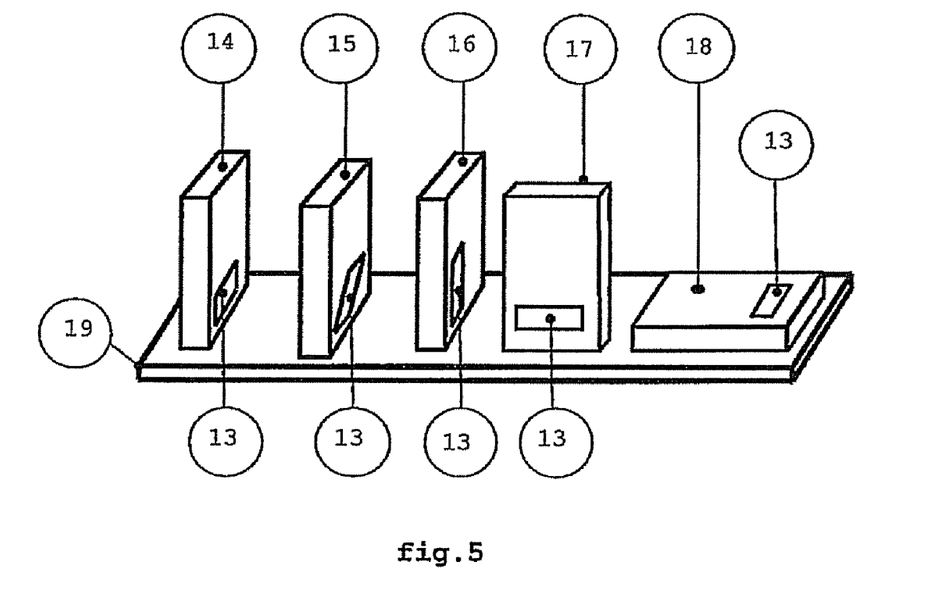
FIG. 5 is a schematic representation of an embodiment in which the device is embedded in a bookshelf, to realize the concept of smart shelves, giving orientation detection guidelines for the books and RFID tags in accordance with the invention.

One embodiment of the present invention concerns to bookshelves for book detection and identification in bookstores or libraries. FIG. 5 shows the orientation detail for the books 14-18 and respective RFID tags 13 with the device embedded or attached to a shelf 19. The RFID tags 13 can be glued in the covers, or within the books 14-17 and the transmission line 6 of the device 1 can perform a straight path (FIG. 2) or curvilinear (FIG. 3), with a reduced curvature radius. Given the volumetric confinement of the electric field 11 in the structure, reliable detection of all the books 14 to 18 require that the RFID tags 13 are near to the surface of the shelf 19. For example, for linear polarized RFID tags 13 the preferred orientation for the RFID tags of 13 of the books 14 to 18 corresponds to the horizontal, transversal to the shelf 19, book 14, where the electric field intensity is higher. However, RFID tags 13 are also detected when attached into books with 45° inclinations, book 15, or even. 90°, book 16, although the detection may be less reliable in the latter case. Regarding the position of books 14 to 18 on the shelf 19, detection also occurs for other positions and orientations of the RFID tags 13 and for books 17 and 18, although with greater reliability in the case the path of transmission line 6 is curvilinear.

Example 2

Conveyor Belts

Figure 6:
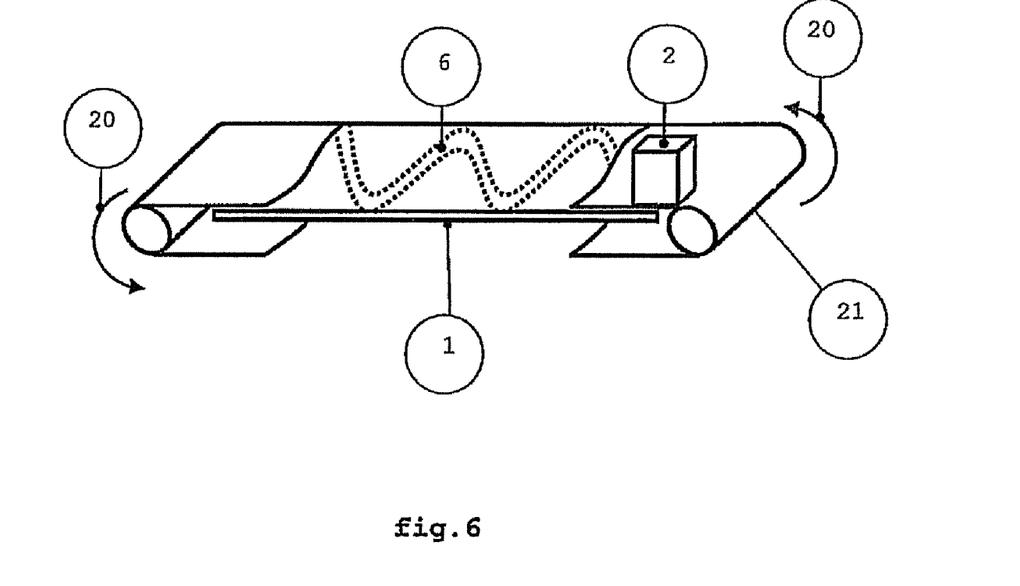

Another embodiment of the present invention is a conveyor belt. As the meandered curvature of the transmission line 6 in the device 1 is increased, the maximum vertical detection range for RFID tags 13 increases. However, the coverage is reduced in depth in certain areas of the device 1, but the field intensity above the transmission line 6 is similar in all directions. This feature allows the applicability of the invention, for example, in conveyor belts 21 for objects 2 transportation in supermarket payment terminals or warehouses, as shown in FIG. 6. With the movement 20 of the conveyor belt 21, the objects 2 placed above it sweep along the device that is fixed and mounted beneath the rotating belt. For such applications, it is not necessary that the device 1 extends along the entire length of the conveyor belt 21, it is only necessary that the object 2 sweeps through a distance equivalent to a period of the curvilinear line 6, if it is periodic. Thus, detection of objects 2 is unrestricted to the orientation and position of the RFID tags 13.

Example 3

Point Readers and Payment Terminals

Figure 7A:
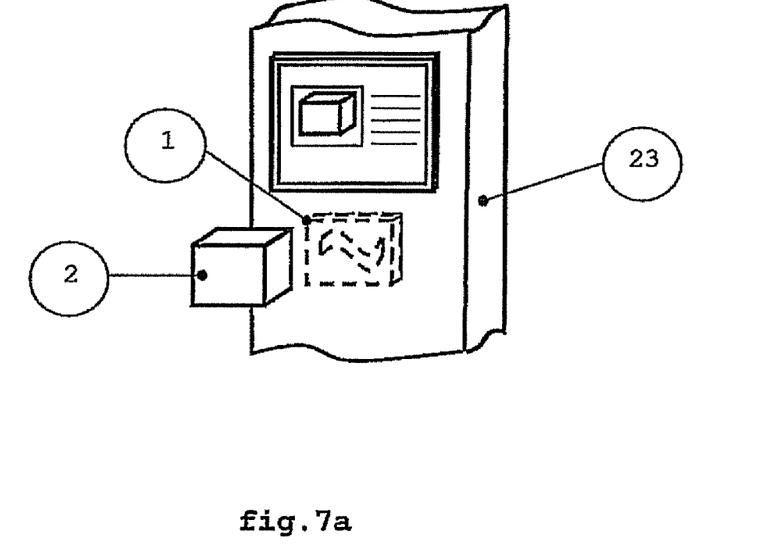
FIG. 7a and FIG. 7b are schematic representations of the embodiment of the invention, as an RFID reading point for object identification in accordance with the invention.
Figure 7B:
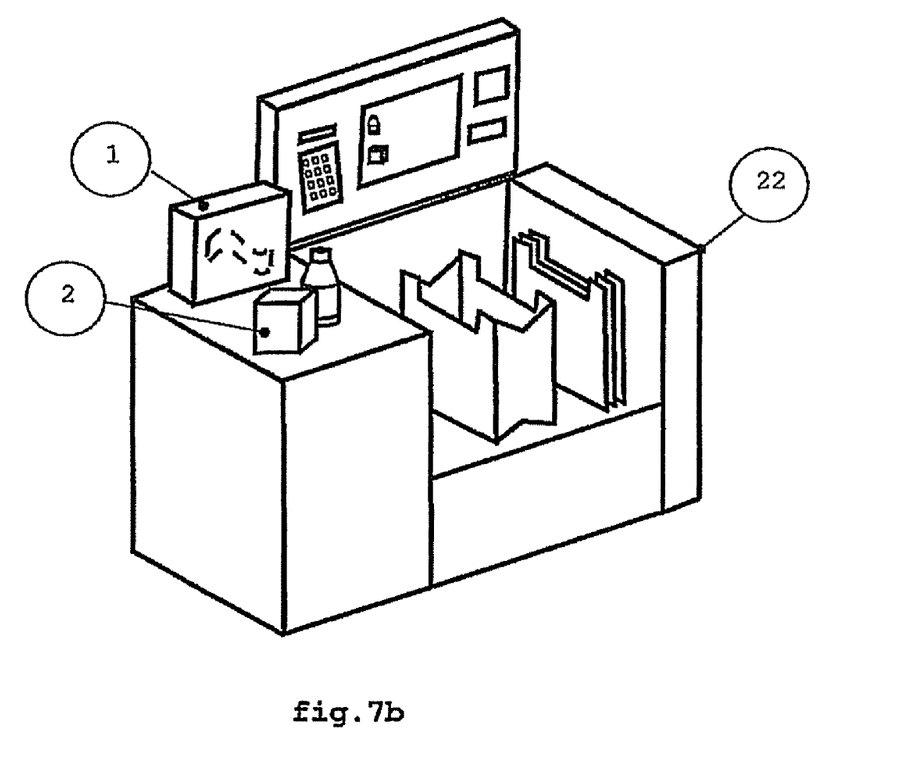

A third and fourth embodiments of the present invention are point reader and payment terminals. As previously mentioned, the length of the invention is not a restriction to its implementation and therefore smaller embodiments, similar to the existing terminals for reading bar codes, are foreseen. One example is the RFID point reader 23, arranged in several areas in shops or in payment terminals 22, as shown in FIG. 7a and FIG. 7b, respectively. The choice of the configuration for the transmission line 6 of the device 1 depends on the desired range and on the orientation of the RFID tags 13 on the objects 2 to be identified. The fields volumetric confinement of the device 1 is provided by the transmission lines 6 with total length next or superior to the wavelength at UHF. Unlike optical bar code reader, the RFID point reader 22 and 23 do not require line of sight with the RFID tags 13 and allows simultaneous detection of all products 2 in the detection volume.

Figure 8:
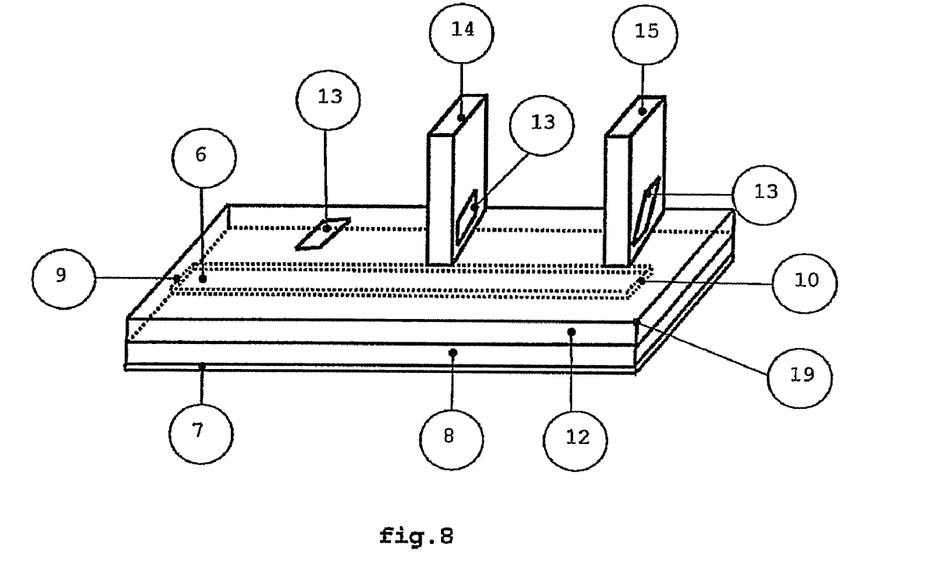
FIG. 8 is a perspective embodiment of a shelf prototype, including the protective material layer for the transmission line.

For validation purposes of the invention a prototype was fabricated and tested, shown in FIG. 8, corresponding to shelf 19 for a library or bookstore. The manufactured shelf 19 has 30 cm depth by 100 cm in length, corresponding to a typical size in bookstores. Expanded polystyrene was used as low permittivity substrate 8 due to its low permittivity. To ensure a good electric field coverage above the shelf 19 entire surface, a thickness of cm was chosen for the low permittivity substrate 8, resulting in a straight transmission line 6 with a 5 cm width so that an impedance of 50Ω is obtained. The transmission line 6 is centred and the reference ground plane has the same dimensions of the shelf 19. The transmission line 6 is fed by a coaxial cable 9 on one end and is terminated by a 50Ω resistance 10 on the other. An additional layer 12 of expanded polystyrene substrate 12, with thickness equal to the low permittivity substrate 8, was applied above the transmission line 6 to enhance the stability of the shelf 19 and to avoid direct contact of the objects to the transmission line 6 metal. This structure was laid on a wooden layer with the same dimensions to ensure rigidity and to support the books weight.

The fabricated device 9 was further experimentally tested for RFID tags 13 detection, both isolated and attached to the back cover of books 14 and 15. The RFID reader from Alien Technologies—ALR 8800, with impedance equal to the transmission line 6 of the invention was used and connected to one of the ends of the shelf 19 via a coaxial cable 9. The RFID reader or interrogator 3 transmits the reading results to a computer 5 for display and processing. Passive linear polarized RFID tags 13 ALN-950 "Squiggle", from the same manufacturer, were used.

For testing the isolated RFID tag 13, this was disposed horizontally and in transverse orientation in relation to the transmission line 6, as shown in the FIG. 8. The detection was examined at several points in the shelf 19, equally distributed with a horizontal spacing of 10 cm. The tests demonstrated a 100% reading score for all positions up to 7 cm in height above the surface of the shelf. Only beyond this high, the detection score is less than 100%, which demonstrates the obtained volumetric confinement volume.

Figure 9:
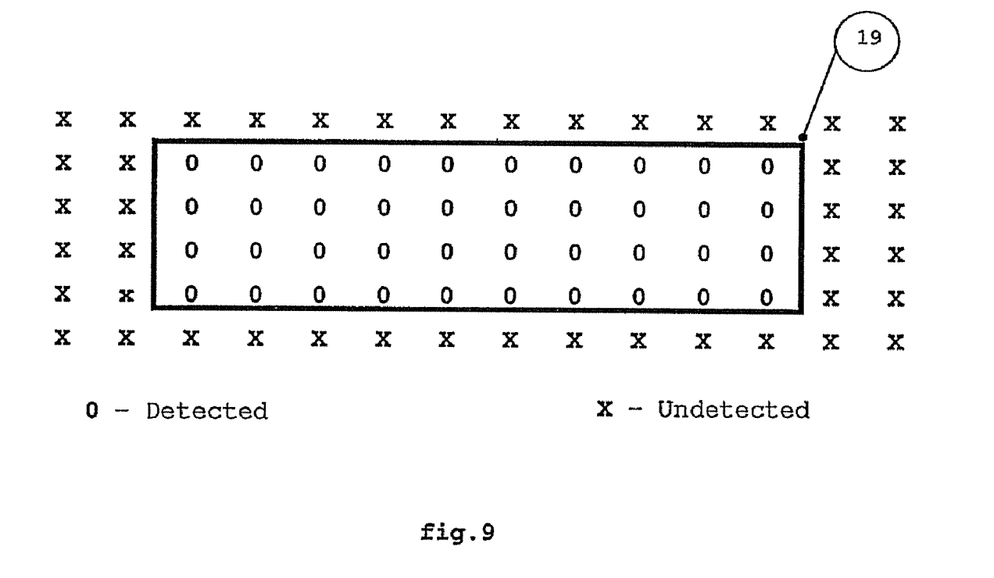
FIG. 9 is a representation of the results of an experimental test with books performed with a prototype of the invention.

The RFID tags 13 were also placed inside of books with several orientations and in several positions and the detection of books 14 and 15 was tested placing them on the shelf 19 in the marked positions in FIG. 9. The reading score, listed in the same figure, shows that the books 14 and 15 were always detected within the limits of the shelf 19, but not outside. The slight top excess coverage can be adjusted by reducing the total length of transmission line 6 in order to retract the start point and end point of the transmission line 6.

The experimental results demonstrate the functionality and validate the applicability and reliability of the invention: a 100% coverage for the books on the shelf is easily feasible with few orientation restrictions for the RFID tags.

The present invention can be applied for the detection of several objects, without any restrictions on tags type and across the entire UHF band allocated to radio frequency identification, ensuring volumetric confinement to the desired detection region.

As example of envisioned applications of the invention considered within its scope are:

In retail (for example, in bookstores, clothing stores, supermarkets or pharmacies) for detection, localization and automatic inventorying of RFID tagged products or goods;

In retail, at point readers or payment terminals to enable reading, of RFID tags, of the information concerning a product or isolated good and placed in the vicinity of the device;

In retail, in conveyor belts at the payment terminals, to enable reading and information processing of tagged objects as they slide over the device;

In Distribution, in conveyor belts for objects, to enable reading and information processing of tagged objects as they slide over the device;

In industry, in conveyor belts for objects either in production or in warehouses, to enable reading and information processing of tagged objects as they slide over the device.

Lisbon, Jun. 26, 2009.

The invention claimed is:

1. A device for reading radio frequency identifiers (RFID) ensuring volumetric confinement at UHF of the detection of RFID tags to a desired volume above a reading surface, which includes one or more metallic transmission lines printed on a dielectric substrate, on a metallic reference ground plane, an RFID reader or interrogator at one end and a load at the other end characterized by further comprising a structure, that comprises the reading surface, in which one or more transmission lines, the dielectric substrate and the metallic reference ground plane are embedded or attached, and the electric fields are contained in planes perpendicular to one or more transmission lines with one to five wavelengths that extend over all or part of the length of the reading surface, and wherein the dielectric substrate has low permittivity, less than 1.5 and the width of the transmission line is comprised between 8 and 15% of the wavelength.

2. A device according to claim 1, which additionally comprises a matching circuit when the characteristic transmission line impedance is different from the RFID reader or interrogator impedance.

3. A device according to claim 1, wherein one or more transmission lines with straight or curvilinear paths along the reading surface of the structure.

4. A device according to claim 1, wherein the low permittivity substrate is expanded polystyrene.

5. A device according to claim 1, wherein the reference ground plane corresponds to structure when this is metallic.

6. A device according to claim 1, wherein the extension of the reading surface is controlled by the width of the transmission line, with widths between 8 and 15% of the wavelength, and by the dimensions of the reference ground plane.

7. A device according to claim 6, wherein the dimension of the reference ground plane is at least 90% of the reading surface.

8. A device according to claim 7, wherein structure has depth of 30 cm and a length of 100 cm, the low permittivity substrate is 1 cm thickness, the transmission line is 5 cm width for a 50Ω impedance and the reference ground plane has the same dimensions of the structure.

9. A device according to claim 1, operating in the band between 860 and 960 MHz.

10. An RFID tags confined detection system wherein several devices according to claim 1 are mounted in association.

* * * * *